US009863072B2

(12) United States Patent
Kroczynski et al.

(10) Patent No.: US 9,863,072 B2
(45) Date of Patent: Jan. 9, 2018

(54) ROTARY BRAIDING MACHINE

(71) Applicant: Karg Corporation, Tallmadge, OH (US)

(72) Inventors: Mark Kroczynski, Akron, OH (US); Michael Karg, Pompano Beach, FL (US)

(73) Assignee: Karg Corporation, Tallmadge, OH (US)

( * ) Notice: Subject to any disclaimer, the term of this patent is extended or adjusted under 35 U.S.C. 154(b) by 0 days.

(21) Appl. No.: 15/107,944

(22) PCT Filed: Jan. 27, 2016

(86) PCT No.: PCT/US2016/015114
§ 371 (c)(1),
(2) Date: Apr. 14, 2017

(87) PCT Pub. No.: WO2017/131663
PCT Pub. Date: Aug. 3, 2017

(65) Prior Publication Data
US 2017/0233908 A1 Aug. 17, 2017

(51) Int. Cl.
*D04C 3/42* (2006.01)
*F16C 7/06* (2006.01)

(52) U.S. Cl.
CPC . *D04C 3/42* (2013.01); *F16C 7/06* (2013.01)

(58) Field of Classification Search
CPC .................................... D04C 3/42; F16C 7/06
See application file for complete search history.

(56) References Cited

U.S. PATENT DOCUMENTS

| | | | | | |
|---|---|---|---|---|---|
| 778,889 | A | | 1/1905 | Plowden | |
| 1,473,677 | A | * | 11/1923 | Hoffmann | F16G 11/12 280/854 |
| 3,051,519 | A | * | 8/1962 | Sudeikis | B60D 1/182 280/482 |
| 3,892,161 | A | | 7/1975 | Sokol | |
| 4,012,967 | A | * | 3/1977 | Warren | F16C 7/04 403/43 |
| 4,034,642 | A | | 7/1977 | Iannucci et al. | |
| 4,372,191 | A | | 2/1983 | Iannucci et al. | |
| 4,641,810 | A | * | 2/1987 | Ott | B60K 5/125 248/635 |
| 4,729,278 | A | | 3/1988 | Fraeff et al. | |
| 5,099,744 | A | * | 3/1992 | Hurst | D04C 3/42 87/45 |
| 5,429,014 | A | * | 7/1995 | Laue | B21K 1/766 29/428 |
| 5,505,106 | A | * | 4/1996 | Herman | B62D 17/00 384/276 |

(Continued)

*Primary Examiner* — Shaun R Hurley
(74) *Attorney, Agent, or Firm* — Renner Kenner Greive Bobak Taylor & Weber

(57) ABSTRACT

In one aspect, various embodiments of the present invention are directed to a rotary braiding machine capable of braiding wire around a cable, hose, mandrel, or other similar item, having actuator arm mechanism that includes a mechanism for fine-tuning of the dwell timing of the transfer arms. In another aspect, one or more embodiment of the present invention is directed to a method for controlling the dwell timing of a transfer arm in a rotary braiding machine by adjusting the length of the actuator arm mechanism.

12 Claims, 11 Drawing Sheets

(56) References Cited

U.S. PATENT DOCUMENTS

| | | | | | |
|---|---|---|---|---|---|
| 5,522,281 | A * | 6/1996 | Herman | B62D 17/00 384/276 |
| 5,787,784 | A | 8/1998 | Scherzinger | |
| 6,318,227 | B1 | 11/2001 | Scherzinger | |
| 6,370,999 | B1 | 4/2002 | Lache et al. | |
| 6,694,855 | B1 | 2/2004 | Emmerich et al. | |
| 6,966,567 | B2 * | 11/2005 | McLaughlin | B60G 7/003 280/93.51 |
| 2011/0277618 | A1 * | 11/2011 | Giszter | D04C 3/42 87/8 |

* cited by examiner

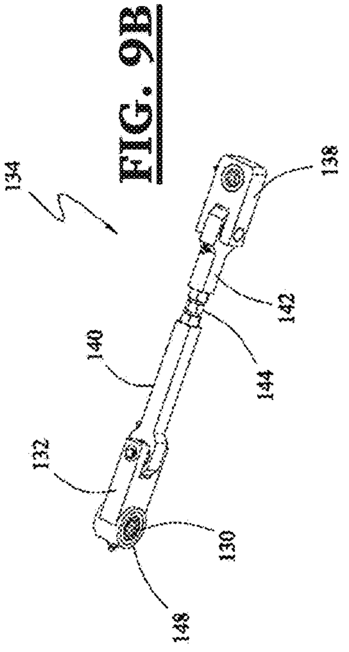
FIG. 9B
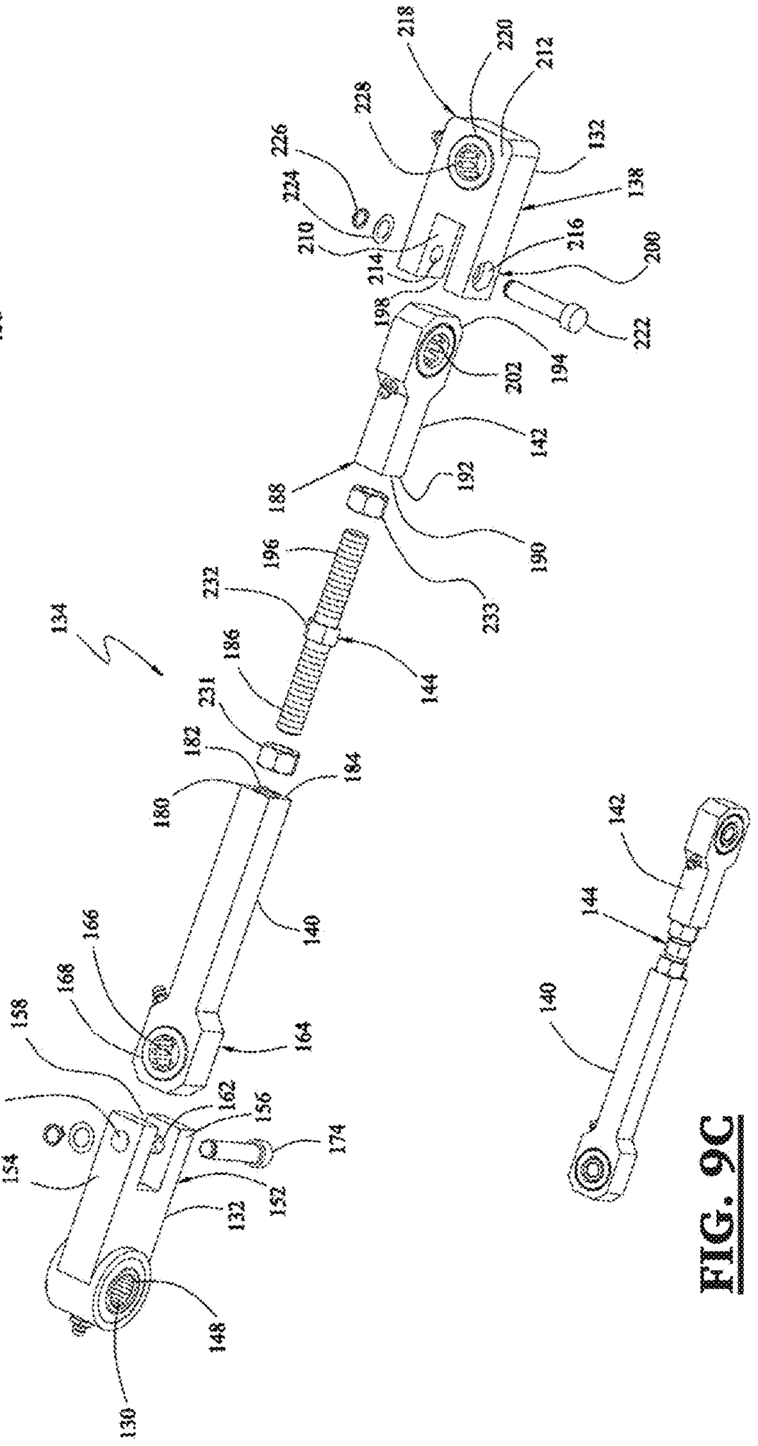
FIG. 9A
FIG. 9C

ROTARY BRAIDING MACHINE

CROSS REFERENCE TO RELATED APPLICATIONS

This application claims the benefit of Internation patent application serial number PCT/US16/15114 entitled “Rotary Braiding Machine,” filed Jan. 27, 2016 and incorporated herein by reference in its entirety.

FIELD OF THE INVENTION

In one or more embodiments, the present invention relates to a rotary braiding machine. In certain embodiments, the present invention relates to a rotary braiding machine for braiding wire having an improved actuator arm mechanism.

BACKGROUND OF THE INVENTION

Rotary braiding machines are well known in the art and have been used to, among other things, braid strands of materials such as steel, stainless steel, bronze, polyester, nylon, arramed, carbon fibers and similar materials around substrates such as hoses or cables and have been of particular used in forming pressure resistant hydraulic hose. In various configurations, these rotary braiding machines feature two sets of bobbin carriers rotating in opposite directions along the same axis and the strands paying out from one set of bobbin carriers are moved around one or more of the other set of bobbin carriers, to form a braid.

There are a number of significant drawbacks with the rotary braiding machines known in the art, particularly when used to braid metal strands. The rotary braiding machines known in the art are overly complex and complicated. This complexity makes it difficult to keep the machines properly adjusted so they can be operated at higher speeds while maintaining high quality braids. Moreover, many prior art designs make it difficult and/or impossible to make the small timing adjustments that are necessary for the machine to operate efficiently, particularly, at higher speeds.

Accordingly, what is needed in the art is a rotary braiding machine capable of braiding wire around a cable, hose, or other similar item that is simpler and faster than conventionally available rotary braiding systems.

SUMMARY OF THE INVENTION

One or more embodiments of the present invention provide a braiding machine capable of braiding wire around a cable, hose, mandrel, or other similar item, having an improved actuator arm mechanism that is simpler than conventionally available rotary braiding systems and can be fine-tuned for faster and more efficient braiding.

In one or more embodiments, the present invention is directed to an apparatus for controlling the dwell timing of a transfer arm in a rotary braiding machine comprising: a crank; a cam for moving a transfer arm of a rotary braiding machine; an actuator arm mechanism operatively connected to said crank and said cam comprising: a first actuator arm having a crank end operatively connected to said crank and an adjuster end having a threaded opening with threads oriented to rotate in a first direction; a second actuator arm having a cam end operatively connected to said cam and an adjuster end having a threaded opening with threads oriented to rotate in a second direction that is opposite to said first direction; an actuating arm adjuster connected to the adjuster end of said first actuator arm and the adjuster end of said second actuator arm for controlling the length of said actuator arm mechanism.

In one or more of these embodiments the actuating arm adjuster comprises: a first threaded end sized to fit within the threaded opening in the adjuster end of said first actuator arm and the threads of the first threaded end of said actuating arm adjuster being configured to mesh with the threads of the threaded opening in the adjuster end of said first actuator arm; a second threaded end sized to fit within the threaded opening of the adjuster end of said second actuator arm and the threads of the second threaded end of said actuating arm adjuster being configured to mesh with the threads of the threaded opening in the adjuster end of said second actuator arm; and a central portion configured to mate with a tool for turning said actuating arm adjuster to lengthen or shorten said actuator arm mechanism.

In one or more embodiments, the apparatus of the present invention may include one or more of the above referenced embodiments wherein said actuating arm adjuster further comprises a first retaining nut having threads configured to mesh with the threads of the first threaded end of said actuating arm adjuster and a second retaining nut having threads configured to mesh with the threads of the second threaded end of said actuating arm adjuster. In one or more embodiments, the apparatus of the present invention may include one or more of the above referenced embodiments wherein said actuator arm mechanism has a dwell timing the may be adjusted by turning said actuating arm adjuster. In one or more embodiments, the apparatus of the present invention may include one or more of the above referenced embodiments wherein said actuator arm mechanism has a dwell timing the may be adjusted by turning said actuating arm adjuster to lengthen or shorten said actuator arm mechanism.

In one or more embodiments, the apparatus of the present invention may include one or more of the above referenced embodiments wherein said first actuator arm is connected to said crank via an arm pivot, wherein said arm pivot comprises a crank end having an opening for receiving an offset post on said crank and a forked end for receiving the crank end of said first actuator arm. In one or more embodiments, the apparatus of the present invention may include one or more of the above referenced embodiments wherein the offset post on said crank is free to rotate with respect to said arm pivot in a first plane and the crank end of said first actuator arm is free to rotate with respect to said arm pivot in a second plane, offset from said first plane by about 90 degrees.

In one or more embodiments, the apparatus of the present invention may include one or more of the above referenced embodiments wherein said second actuator arm is connected to said cam via an arm pivot, wherein said arm pivot comprises a cam end having an opening for receiving a post on said cam and a forked end for receiving the cam end of said second actuator arm. In one or more embodiments, the apparatus of the present invention may include one or more of the above referenced embodiments wherein said cam is free to rotate with respect to said arm pivot in a first plane and the cam end of said second actuator arm is free to rotate with respect to said arm pivot in a second plane, wherein said first plane is offset from said second plane by about 90 degrees. In one or more embodiments, the apparatus of the present invention may include one or more of the above referenced embodiments wherein the crank end of said first actuator arm further comprises a substantially cylindrical opening having an axis and the cam end of said second actuator arm further comprises a substantially cylindrical opening having an axis perpendicular to the axis of the substantially cylindrical opening in the crank end of said first actuator arm.

In another embodiment, the present invention is directed a method of adjusting the dwell timing using the apparatus described above comprising using actuating arm adjuster to change the length of the actuating arm. In another embodiment, the present invention is directed a method of adjusting the dwell timing using the apparatus described above comprising: securing a tool to the central portion of the actuating arm adjuster; using the tool to rotate the central portion of the actuating arm adjuster to lengthen or shorten said actuator arm mechanism and adjust the dwell timing.

BRIEF DESCRIPTION OF THE DRAWINGS

For a more complete understanding of the features and advantages of the present invention, reference is now made to the detailed description of the invention along with the accompanying figures in which:

FIGS. 4B-C are enlargements of track assembly along the periphery of the full spindle assembly shown in FIG. 4A.

FIG. 9A is an exploded perspective view of an actuating arm assembly according to one or more embodiments of the present invention.

FIG. 9B-C are a perspective views of an actuating arm assembly according to one or more embodiments of the present invention, with (FIG. 9C) and without (FIG. 9B) arm pivots.

DETAILED DESCRIPTION OF THE ILLUSTRATIVE EMBODIMENTS

In one or more aspect, the present invention is directed to a rotary braiding machine capable of braiding wire around a cable, hose, mandrel, or other similar item, having an improved actuator arm mechanism, track design, and drive mechanism that is simpler and faster than conventionally available rotary braiding systems. In various embodiments, the rotary braiding machines of the present invention are particularly well suited to braiding strands made from sharp and/or abrasive material such as steel wire, spring steel, hard stainless steel, soft stainless steel, plain copper, tinned-copper, gold-plated copper, aluminum, nickel, monel, or bronze, but may also be used for textile braiding.

In general outline, rotary braiding system including those of the present invention includes two sets of carriers, each containing a bobbin holding the wire or other material to be braided, that are driven in opposite directions to form the desired braid around a cable, hose, mandrel, or other similar item. The rear set of carriers are mounted around the perimeter of a round plate having an outer track upon which the front set of carriers ride. Paired with each rear carrier is an improved actuator arm mechanism that moves the wire strands from the rear set of carriers around the wire strands coming from the front set of carriers to form a braid at a braid point that is generally along the axis of rotation of the two sets of carriers and in front of the front set of carriers.

Figure 1:
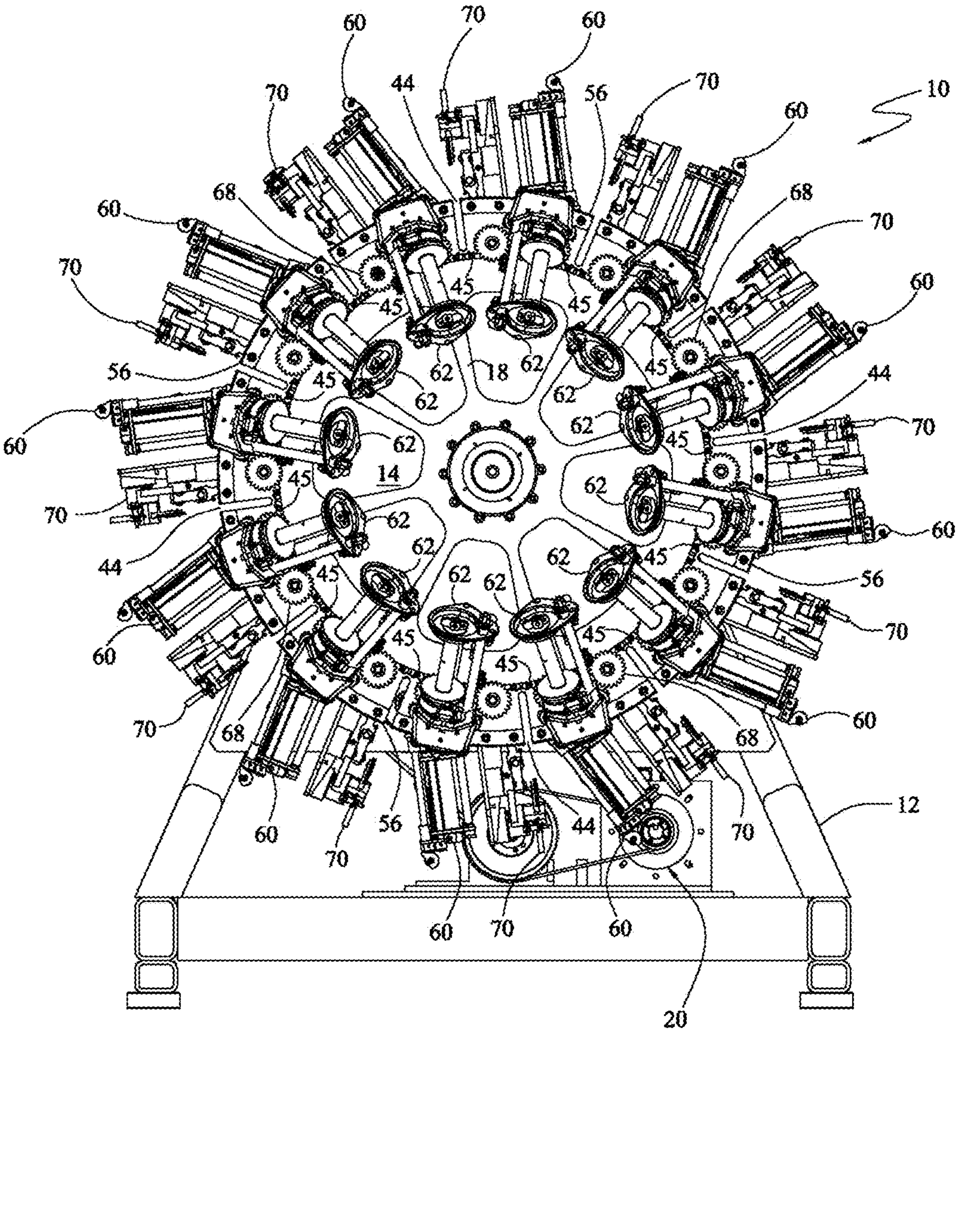
FIG. 1 is a front elevational view of a rotary braiding device according to one or more embodiments of the present invention.
Figure 2:
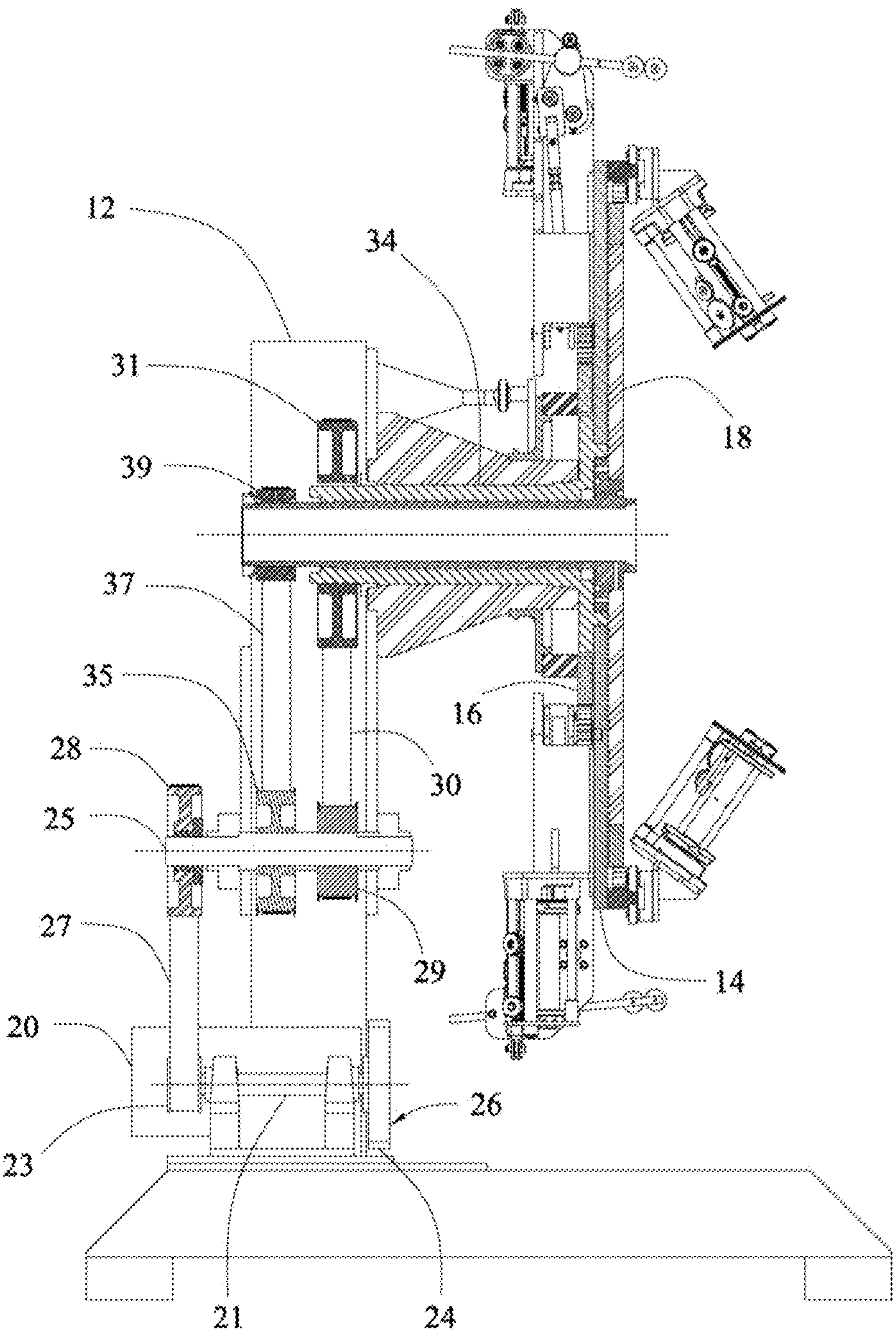
FIG. 2 is a side elevational view in partial cross-section of a rotary braiding device according to one or more embodiments of the present invention.

Referring now to FIGS. 1 and 2, a rotary braiding machine is shown, generally indicated by the numeral 10. Rotary braiding machine 10 includes a metal frame 12 configured to support a plate 14, an internal ring gear 16, and an external ring gear 18. A motor 20 is configured to drive the plate 14 and external ring gear 18 in a first direction at two different speeds. The mechanism by which the motor 20 drives control plate 14 and external ring gear 18 at different speeds in the same direction is not particularly limited and may include belts, pulleys, chains, mechanical transmissions, gears and/or gear racks.

Figure 3:
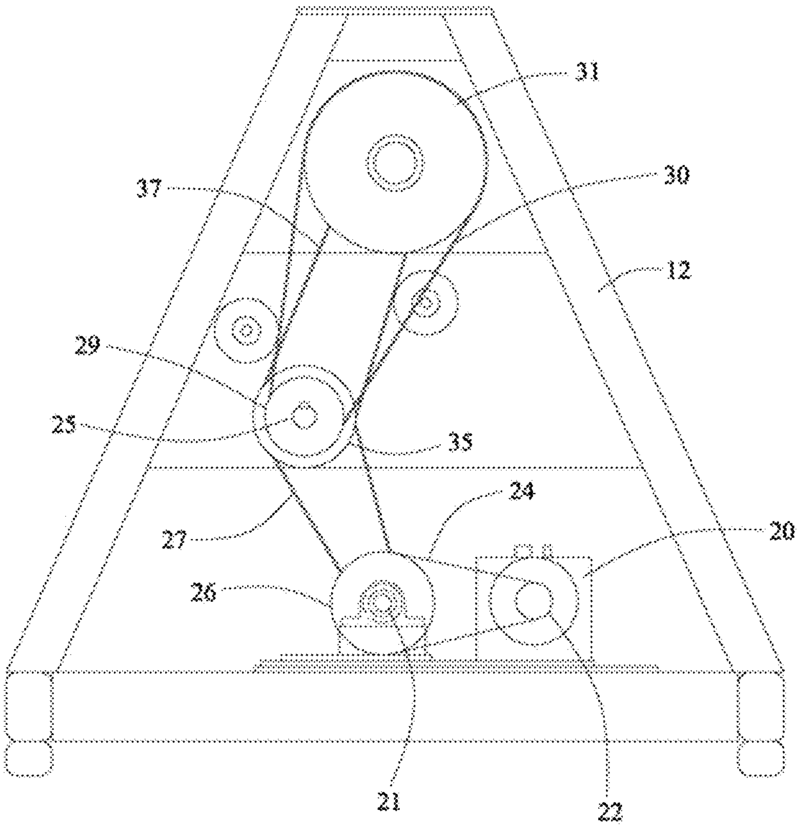
FIG. 3 is a rear elevational view of the support and transmission elements of a rotary braiding device according to one or more embodiments of the present invention.
Figures 4A, 4B, 4C:
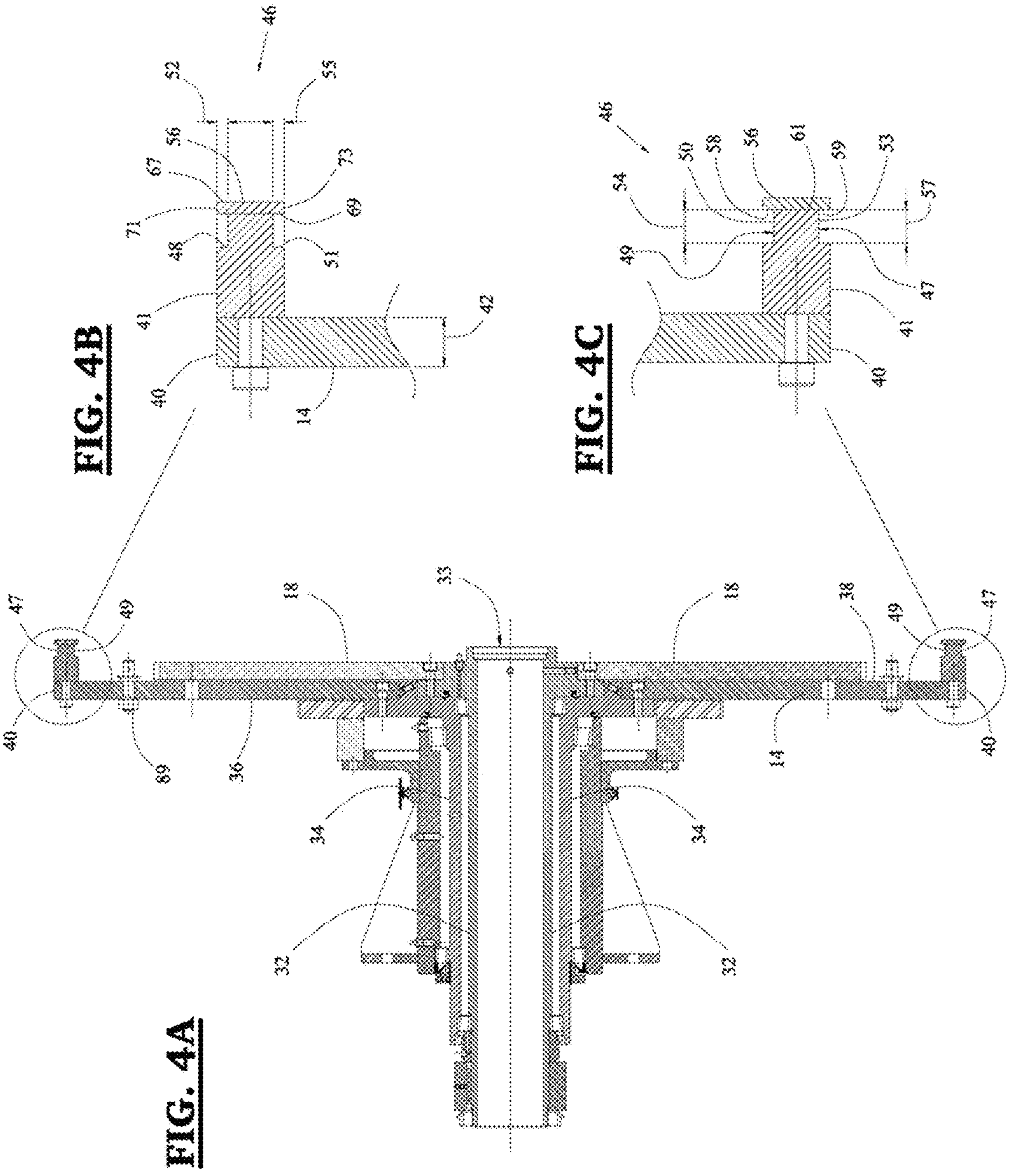
FIGS. 4A-C are cross sectional views of the spindle assembly of a rotary braiding device according to one or more embodiments of the present invention.

A representative drive mechanism for rotary braiding machine 10 is shown in FIGS. 2, 3 and 4A. In the embodiment best shown in FIGS. 2 and 3, motor 20 drives a drive pulley 22 that is connected by a first belt 24 to a first pulley 26 located on a jack shaft 21. As jack shaft 21 rotates, a second pulley 23 on jack shaft 21 drives an intermediate shaft 25 by means of belt 27 running to third pulley 28. Intermediate shaft 25 is connected by forth pulley 29 and belt 30 to outer shaft pulley 31 and drives hollow outer shaft 34, which is connected to and drives plate 14. Intermediate shaft 25 is likewise connected by fifth pulley 35 and belt 37 to inner shaft pulley 39, and drives hollow inner shaft 32. Hollow inner shaft 32 passes through hollow outer shaft 34 and drives external ring gear 18. Hollow inner shaft 32 further includes central opening 33. In these embodiments, the outer shaft pulley 31 connected to a hollow outer shaft 34 will have a larger diameter than inner shaft pulley 39 attached or secured to hollow inner shaft 32.

It will be appreciated by those of skill in the art that in this configuration, rotation of the drive pulley 22 by motor 20 will cause control plate 14 and external ring gear 18 to rotate at different speeds in the same direction. It should likewise be apparent that in these embodiments, the differences in rotational speed between control plate 14 and external ring gear 18 will depend upon the relative diameters of forth pulley 29, fifth pulley 35, outer shaft pulley 31, and inner shaft pulley 39. These relative speeds of the control plate 14 and external ring gear 18 needed for braiding are well known and one of ordinary skill in the art will be able to select a forth pulley 29, fifth pulley 35, outer shaft pulley 31, and inner shaft pulley 39 having diameters necessary to produce the required ratio or rotational speeds between the plate 14 and external ring gear 18 needed for braiding.

Figure 5:
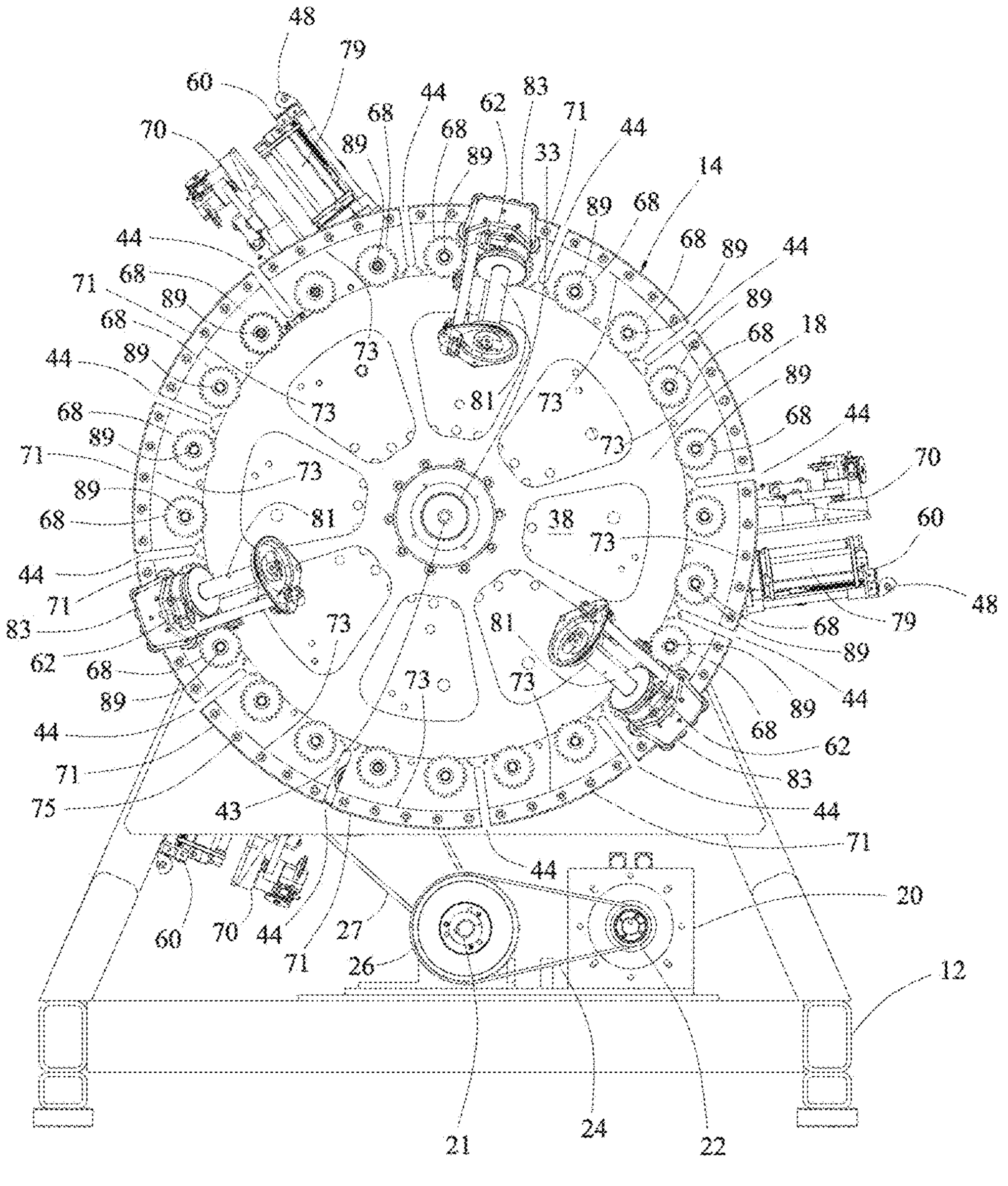
FIG. 5 is a front elevational view of a rotary braiding device according to one or more embodiments of the present invention having most of the front and rear carriers removed.

As can be seen in FIGS. 4A and 5, control plate 14 is generally round and has a rear surface 36, a front surface 38, and an outer edge surface 40, a thickness 42, and a center point 43. The thickness 42 of control plate 14 is not particularly limited provided that control plate 14 is thick enough to prevent bending or deforming during the braiding process. Control plate 14 has a series of slots 44 running radially inward from outer edge surface 40 toward the center point 43 of control plate 14 that are located at regular intervals around the circumference of control plate 14. The length of slots 44 will depend upon the size and operation of the rotary braiding machine 10 and is not particularly limited provided that slots 44 are long enough to permit braiding as described below. In some embodiments, slots 44 are from about 5 inches to about 15 inches length.

It is anticipated that plate 14 will have at least as many slots 44 as it has working rear carriers. In one or more embodiments of the present invention, plate 14 may have from about 4 to about 100 slots. In one or more embodiments of the present invention, plate 14 may have from about 4 to about 80 slots. In one or more embodiments of the present invention, plate 14 may have from 4 to 60 slots. In one or more embodiments of the present invention, plate 14 may have from 4 to 20 slots. In one or more embodiments of the present invention, plate 14 may have from 10 to 100 slots. In one or more embodiments of the present invention, plate 14 may have from 30 to 100 slots. In one or more embodiments of the present invention, plate 14 may have from 50 to 100 slots. In one or more embodiments of the present invention, plate 14 may have from 70 to 100 slots. In one or more embodiments of the present invention, plate 14 may have about 24 slots. In one or more embodiments of the present invention, plate 14 may have about 36 shots. Adjacent to and in line with the inward end of each of slots 44 is a slot roller 45.

As can be seen in FIGS. 4A-C, and 5, attached on front surface 38 around the perimeter of control plate 14 and between slots 44 are a plurality of track sections 41 that together form a front carriage track 46 having an upper track 47 that faces radially outward, a lower track 49 facing radially inward and a front face 61. The track sections 41 may be secured to the control plate 14 by any conventional means known in the art for that purpose including without limitation, screws and/or bolts. Upper track 47 of front carriage track 46 has an inner wall 48 and track bottom 50, that, together with curved plate 56, form an upper track depth 52 and an upper track width 54.

Lower track 49 faces radially inward from track sections 41 toward center point 43 and has an inner wall 51 and lower track bottom 53 running around the circumference of control plate 14 along the underside of track sections 41. Lower track 49 has a depth 55 and a width 57, defined by inner wall 51, lower track bottom 53, and curved plates 56. While this need not be the case and other embodiments are possible, lower track 49 is preferably formed in such a way that only lower track inner wall 51 and lower track bottom 53 of lower track 49 are formed by track sections 41. In some embodiments, length and width of upper track 47 and lower track 49 may be the same.

In these embodiments, curved plates 56 are removably secured to the front surface 61 of track sections 41 along the outer edge surface 40 and between slots 44. These curved plates 56 have an upper portion 67 extending radially outward beyond upper track bottom 50 and a lower portion 69 extending radially inward beyond lower track bottom 53, thereby forming an outer wall 58 for upper track 47 and an outer wall 59 for lower track 49. Curved plates further include an arcuate upper edge 71 and an arcuate lower edge 73 that are substantially parallel. In some embodiments, arcuate upper edge 71 and arcuate lower edge 73 are substantially parallel to the perimeter of control plate 14. Curved plates 56 may be removably secured to the front surface 61 of track sections 41 using any means known in the art for that purpose, including without limitation, screws and/or bolts. In some embodiments, curved plates 56 are removably secured to the front surface 61 of track sections 41 using bolts 75 received into two or more threaded openings in front surface 61. In addition, curved plates 56 may be removed to enable front carriers 62 to be installed on front carrier track 46 or removed for maintenance.

Secured at regular intervals to the rear surface 36 and around the periphery of control plate 14 are a set of rear carriers 60. The number of rear carriers 60 is not particularly limited except that there must be at least enough rear carriers 60 to form the intended braid and all of the rear carriers 60 being used must fit around the periphery of control plate 14. In some embodiments, there are from about 4 to about 100 rear carriers 60. In some embodiments, there are from about 4 to about 60 rear carriers 60. In some embodiments, there are from about 4 to about 20 rear carriers 60. In some embodiments, there are from about 10 to about 50 rear carriers 60. In some embodiments, there are about 12 rear carriers 60. In some embodiments, there are about 24 rear carriers 60. In some embodiments, there are about 36 rear carriers 60.

Any conventional bobbin carrier known in the art for use with rotary braiding machines may be configured to work as rear carrier 60. Rear carriers 60 each contain a bobbin 79 wound with a suitable material to be braided, and a tensioning mechanism 48 for regulating the tension on the wire or other material leaving the rear carrier 60. Tensioning mechanism 48 is not particularly limited and any suitable tensional mechanism may be used without departing from spirit of the present invention. Suitable materials for braiding using the rotary braiding machine of various embodiments of the present invention include, without limitation strands comprising steel wire, spring steel, hard stainless steel, soft stainless steel, plain copper, tinned-copper, gold-plated copper, aluminum, nickel, monel, bronze, or various textiles, including without limitation, cotton, polyester, nylon, and/or rayon. As will be apparent to those of skill in the art, rear carrier 60 in general, and bobbin 79 and tensioning mechanism 48 in particular, must be suitable for the particular material to be braided and in particular, when strands made from steel wire, spring steel, hard stainless steel, soft stainless steel, plain copper, tinned-copper, gold-plated copper, aluminum, nickel, monel, bronze, and/or other sharp or abrasive material are to be braided, a rear carrier 60 configured to be used with these materials should be used. One of ordinary skill in the art will be able to select a carrier for use a rear carrier 60 without undue experimentation.

A corresponding set of front carriers 62 are mounted on trollies 83 running along front carrier track 46 at regular intervals around the periphery of control plate 14. As will be appreciated by those of skill in the art, there will be the same number of front carriers 62 as rear carriers 60. In some embodiments, there are from about 4 to about 100 front carriers 62 are mounted on trollies 83 running along front carrier track 46. In some embodiments, there are from about 6 to about 60 front carriers 62 are mounted on trollies 83 running along front carrier track 46. In some embodiments, there are from about 10 to about 40 front carriers 62 are mounted on trollies 83 running along front carrier track 46.

As with rear carrier 60, any conventional bobbin carrier known in the art for use with rotary braiding machines may be configured to work as front carrier 62. Each of the front carriers 62 contains a bobbin 81 wound with material to be braided and a tensioning mechanism 48 for regulating the tension on the wire or other material leaving the carrier 62. Again, tensioning mechanism 48 is not particularly limited and any suitable tensional mechanism may be used without departing from spirit of the present invention. Suitable materials for braiding using the rotary braiding machine of various embodiments of the present invention include, without limitation strands comprising steel wire, spring steel, hard stainless steel, soft stainless steel, plain copper, tinned-copper, gold-plated copper, aluminum, nickel, monel, bronze, or various textiles, including without limitation, cottons, polyester, nylon, and/or rayon. As with rear carrier 60, front carrier 62, in general, and bobbin 81 and tensioning mechanism 48 in particular, must be suitable for the particular material to be braided and in particular, when strands made from steel wire, spring steel, hard stainless steel, soft stainless steel, plain copper, tinned-copper, gold-plated copper, aluminum, nickel, monel, bronze, and/or, and other sharp or abrasive material are to be braided, a front carrier 62 configured to be used with these materials should be used. One of ordinary skill in the art will be able to select a carrier for use a front carrier 62 without undue experimentation.

Figure 6:
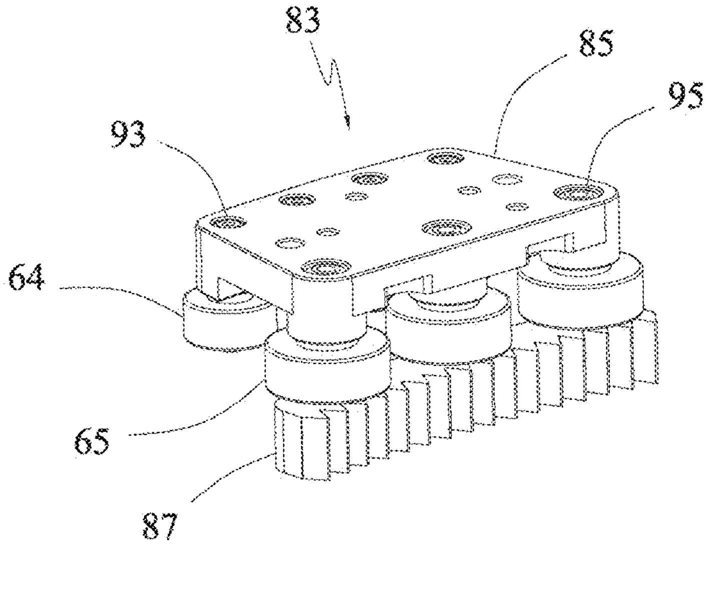
FIG. 6 is a perspective view of a trolley according to one or more embodiments of the present invention.

As can be seen in FIG. 6, trollies 83 comprise a plurality of upper rollers 64 sized to fit within upper track 47, a plurality of lower rollers 65 sized to fit within lower track 49, a mounting platform 85 secured to upper rollers 64 and lower rollers 65, and a rack 87 secured to each of the trollies 83 below lower rollers 65 as shown in FIG. 6. While not particularly limited, in some embodiments each trolley 83 has from 2 to 10 upper rollers 64 and from 2 to 10 lower rollers 65. In some embodiments, each trolley 83 has four upper rollers 64 and three lower rollers 65. Upper rollers 64 and lower rollers 65 may be secured to mounting platform 85 by any suitable means, provided upper rollers 64 and lower rollers 65 are free to rotate. Suitable methods for securing upper rollers 64 to mounting platform 85 may include, without limitation, screws, bolts, rivets, and/or snap rings. In some embodiments, upper rollers 64 are secured to mounting platform 85 by means of stud or bolt 93. Likewise, rack 87 may be secured to each of the trollies 83 below lower rollers 65 by any suitable means known in the art. In some embodiments, rack 87 may be secured to trollies 83 below lower rollers 65 by an elongated stud or bolt having a threaded end, which extends through mounting platform 85 and lower roller 65 and received in a threaded opening (not shown) in the top surface of rack 87.

As can be seen in FIGS. 1 and 5, a plurality of planetary gears 68 are mounted on the front surface 38 and around the periphery of control plate 14. Planetary gears 68 are configured to mesh with external ring gear 18 on the radial inward side and with racks 87 on the radially outward side as the trollies 83 move around front track 46. In some embodiments, planetary gears 68 rotate around a post 89, which is in a bearing (not shown) set in openings in control plate 14.

In some embodiments, there are a set of 12 front carriers 62 located at regular intervals along front carrier track 46 around the periphery of plate 14. As set forth above, the rotary braiding machine of the present invention will have the same number of front carriers 62 as rear carriers 60.

Secured to the rear surface 36 of plate 14 adjacent to each one of the rear carriers 60 is a novel and improved actuator arm mechanism 70. An improved actuator arm mechanism according to one or more embodiments of the present invention is shown in FIGS. 7-12. The actuator arm mechanism 70 shown in FIG. 7 includes a housing 72, which is secured to plate 14 by bolts 74 and houses drive assembly 76. While in the embodiment shown in FIG. 7 the housing 72 is removably secured to plate 14 by bolts 74, the invention is not to be so limited and housing 72 may be secured to plate 14 by any suitable means known in the art without departing from spirit of the present invention.

Figure 8B:
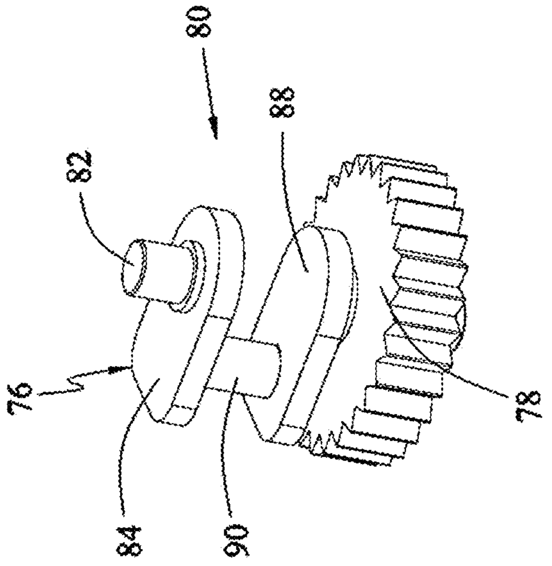
FIG. 8B is a perspective view of a drive assembly according to one or more embodiments of the present invention.
Figure 8A:
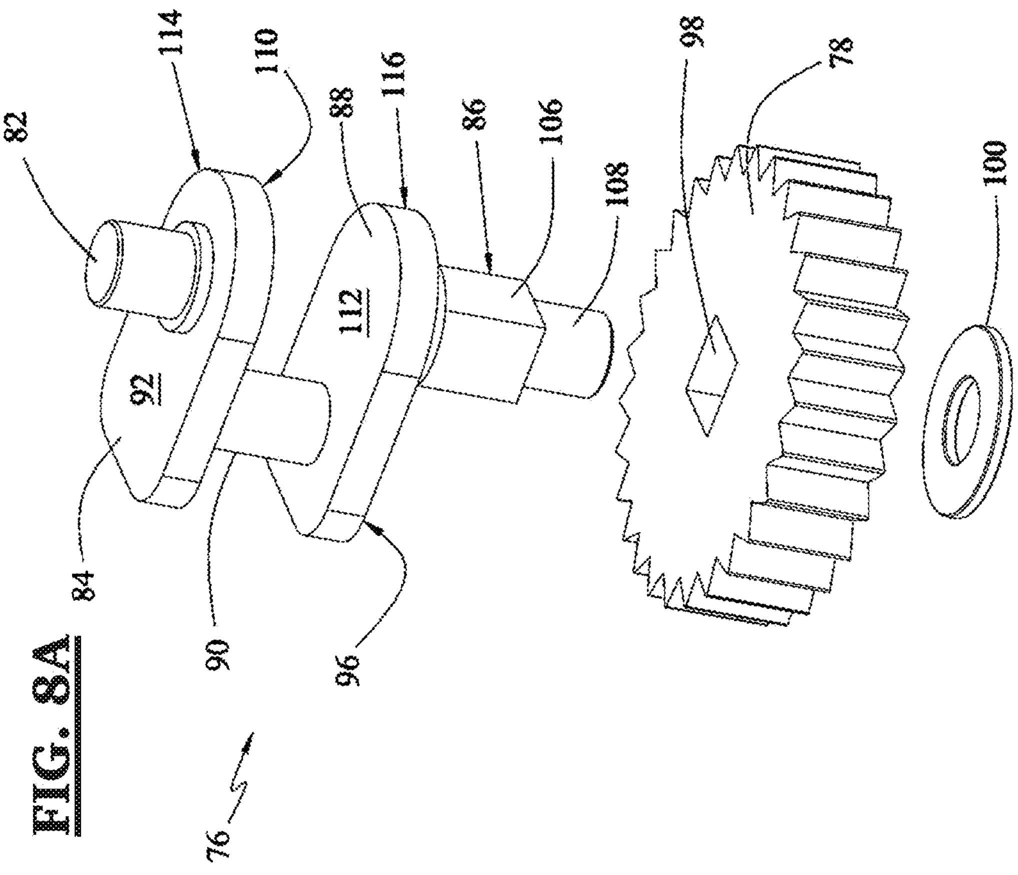
FIG. 8A is an exploded perspective view of a drive assembly according to one or more embodiments of the present invention.

A drive assembly 76 according to one or more embodiments of the present invention is shown in FIGS. 8A-B. Drive assembly 76 includes a planetary gear 78 operatively connected to a crank 80. Actuator arm housing 72 is secured to the rear surface 36 of plate 14 in such a way that planetary gear 78 of drive assembly 76 is located within and meshes with the teeth of internal ring gear 16, which, as set forth above, is stationary. Planetary gear 78 may operatively connected to a crank 80 by any means known in the art for that purpose, provided that any such mechanism prevent rotational movement of the planetary gear 78 relative to crank 80, or visa versa.

As can be seen in FIG. 8A, crank 80 includes outer post 82, outer plate 84, inner post 86, inner plate 88, and offset post 90. Outer post 82 extends outward (i.e. away from plate 14) from the outer surface 92 of outer plate 84 and is received by opening 94 in actuator arm housing 72. Inner post 86 extends inward (i.e. toward plate 14) from an inner surface 96 of inner plate 88 through opening 98 in planetary gear 78 and crank bushing 100, and is received by a bearing (not shown), which is fit within an opening (not shown) in plate 14. In the embodiment shown in FIG. 8A, inner post 86 has an upper portion 106 having a square shaped cross sectional area and a lower portion 108 having a round cross sectional area. In these embodiments, opening 98 in planetary gear 78 will have a corresponding square shape that is configured to mate with the upper portion 106 of inner post 86 to prevent rotational movement between planetary gear 78 and inner post 86 of crank 80. It should be appreciated, however, that while in the embodiment shown in FIG. 8A the cross sectional shape of upper portion 106 of inner post 86 and the shape of opening 98 of planetary gear 78 are both square shaped, the invention is not to be so limited. Upper portion 106 of inner post 86 and opening 98 of planetary gear 78 may have any shapes that will interlock to prevent rotational movement between planetary gear 78 and inner post 86 of crank 80. Lower portion 108 of inner post 86 is configured to mate with a bearing set in an opening in plate 14 (not shown).

As should be apparent, inner post 86 and outer post 82 have a common axis around which crank 80 will rotate. Offset post 90 runs between the inner surface 110 of outer plate 84 and the outer surface 112 of inner plate 88 and will move in a generally circular path as crank 80 rotates.

In some embodiments, crank 80 may be constructed in two parts. In these embodiments, crank 80 may comprise an upper portion 114 containing outer post 82, outer plate 84, and offset post 90 and a lower portion 116 containing inner post 86 and inner plate 88. Upper portion 114 and lower portion 116 of crank 80 may then be joined by any conventional means including using a screw, washer and locking washer. Moreover, in these embodiments, care must be taken to prevent rotational movement between the upper and lower portions 114, 116, of crank 80. The mechanism used to prevent rotational movement between the upper and lower portions 114, 116 of crank 80 is not particularly limited and any suitable mechanism known in the art for that purpose may be used.

Turning now to FIGS. 9A-C, offset post 90 passes through cylindrical opening 130 in arm pivot end 132, thereby connecting crank 80 to actuating arm assembly 134. FIGS. 9A-C depict an actuator arm assembly 134 according to one or more embodiments of the present invention. Actuator arm assembly 134 forms a flexible and generally linear linkage between crank 80 and cam pivot assembly 136 and has an adjustable length. In these embodiments, actuator arm assembly 134 includes arm pivot end 132, arm pivot 138, long actuating arm 140, short actuating arm 142, and actuating arm adjuster 144. As set forth above, at one end, arm pivot end 130 includes cylindrical opening 132 through which offset post 90 of crank 80 passes. In some embodiments, cylindrical opening 130 may also include needle bearings, which may be held in place by one or more thrust washers, but any suitable bearing arrangement known in the art may be used to reduce friction between offset post 90 and arm pivot end 132 as crank 80 turns may be used. In some embodiments, needle bearings 148, may be lubricated by means of a grease fitting.

Arm pivot end 132 further includes forked end 152, configured to receive long actuating arm 140. Forked end 152 includes upper prong 154, lower prong 156, slot 158, and aligned openings 160, 162. As can be seen in FIG. 9A upper prong 154, lower prong 156, slot 158, and aligned openings 160, 162 are oriented along an axis that is perpendicular to the axis of rotation of offset post 90 within cylindrical opening 130. Long actuating arm 140 has a first end 164 sized to fit into slot 158 between upper prong 154 and lower prong 156 and includes opening 166, which is configured to align with aligned openings 160, 162 in upper prong 154 and lower prong 156 of arm pivot end 132. As shown in the embodiment of FIG. 9A, opening 166 in long actuating arm 140 may be fitted with bearing 168, and lubricated by means of a grease fitting. Again, it should be understood that any suitable bearing arrangement known in the art may be used to reduce friction between arm pivot end 132 and long actuating arm 140 may be used. In the embodiment shown in FIG. 9A, arm pivot end 132 is secured to long actuating arm 140 by pivot pin 174 inserted through aligned openings 160, 162, and secured by washer 176 and retaining ring 178. It should be understood however that pivot pin 174 may be held in place by any means known in the art for that purpose including but not limited to a cotter pin, nut, or snap ring.

The second end 180 of long actuating arm 140 has a threaded internal opening 182 running from an end surface 184 of long actuating arm 140 toward the first end 164 of long actuating arm 140, along the longitudinal axis of long actuating arm 140. A threaded internal opening 182 is configured to receive a first threaded portion 186 of actuating arm adjuster 144.

Turning again to FIG. 9A, actuator arm assembly 134 includes short actuating arm 142 having a first end 188 that includes a threaded internal opening 190 running from an end surface 192 of short actuating arm 142 toward a second end 194 of short actuating arm 142, along the axis of short actuating arm 142. Threaded internal opening 190 is configured to receive second threaded portion 196 of actuating arm adjuster 144. The second end 194 of short actuating arm 142 is configured to fit within and be received by, slot 198 in forked end 200 of arm pivot 138 and has an opening 202. As shown in the embodiment of FIG. 9A, opening 200 in short actuating arm 142 may be fitted with bearing 204 and lubricated by means of a grease fitting. Again, it should be understood that any suitable bearing arrangement known in the art may be used to reduce friction between arm pivot 138 and short actuating arm 142 may be used. In some embodiments, short actuating arm 142 is oriented so that the axis of opening 202 is rotated 90 degrees from the axis of rotation of long actuating arm 140 with respect to arm pivot end 132 as is shown in FIGS. 9A-C.

As set forth above, arm pivot 138 includes a forked end 200 having first prong 210, second prong 212, aligned holes 214, 216, and slot 198 and a second end 218 that includes opening 220. In the embodiment shown in FIG. 9A arm pivot 138 is secured to short actuating arm 142 by pivot pin 222 inserted through aligned openings 214, 216, and secured by washer 224 and retaining ring 226. It should be understood however that pivot pin 222 may be held in place by any means known in the art for that purpose including, but not limited to, a cotter pin, nut, snap ring, nut or other similar fastener. As shown in the embodiment of FIG. 9A, opening 220 in pivot arm 138 may be fitted with bearing 228 and lubricated by means of a grease fitting. Again, it should be understood that any suitable bearing arrangement known in the art may be used.

Actuating arm adjuster 144 is connected to the long actuating arm 140 and short actuating arm 142 as described above, and may be used to change the length of the actuator arm assembly 134. An actuating arm adjuster 144 according to one or more embodiments of the present invention is shown in FIGS. 9A-C and includes central nut 232, first threaded portion 186, second threaded portion 196, first retaining nut 231 and second retaining nut 233. In FIGS. 9A-C, central nut 232 has a hexagonal profile, but the invention is not so limited and central nut 232 may have any configuration capable of interfacing with a tool in such a way as to permit actuating arm adjuster 144 to be turned.

The threads of the first threaded portion 186 (and therefore the threads of threaded internal opening 182 of long actuating arm 140) and the second threaded portion 196 (and therefore the threads of threaded internal opening 190 of short actuating arm 142) run in opposite directions. As a result, if central nut 132 is turned in one direction, the first threaded portion 186 will move further into the threaded internal opening 182 of long actuating arm 40 and the second threaded portion 196 will simultaneously move further into the threaded internal opening 190 of short actuating arm 142, thereby pulling the long and short actuator arms closer together and reducing the length of actuator arm assembly 134. If the central nut 132 is turned in the opposite direction, however, the first threaded portion 186 will move further out of threaded internal opening 182 of long actuating arm 140 and the second threaded portion 196 will simultaneously move further out of threaded internal opening 190 of short actuating arm 142, thereby pushing the long and short actuator arms further apart and increasing the length of actuator arm assembly 134. First retaining nut 231 and second retaining nut 233 may be tightened to secure the desired length of actuator arm assembly 134.

In the embodiments shown in FIGS. 7 and 9A-C, the portion the actuator arm connected to arm pivot end 132 (long actuator arm 140) is longer than the portion of the actuator arm connected to the arm pivot 138 (short actuator arm 142) to permit easier access to actuating arm adjuster 144 by moving it further out of actuator arm housing 72 and closer to the edge of the machine. While this arrangement is preferable, the invention is not to be so limited, and other embodiments are possible.

Figure 10B:
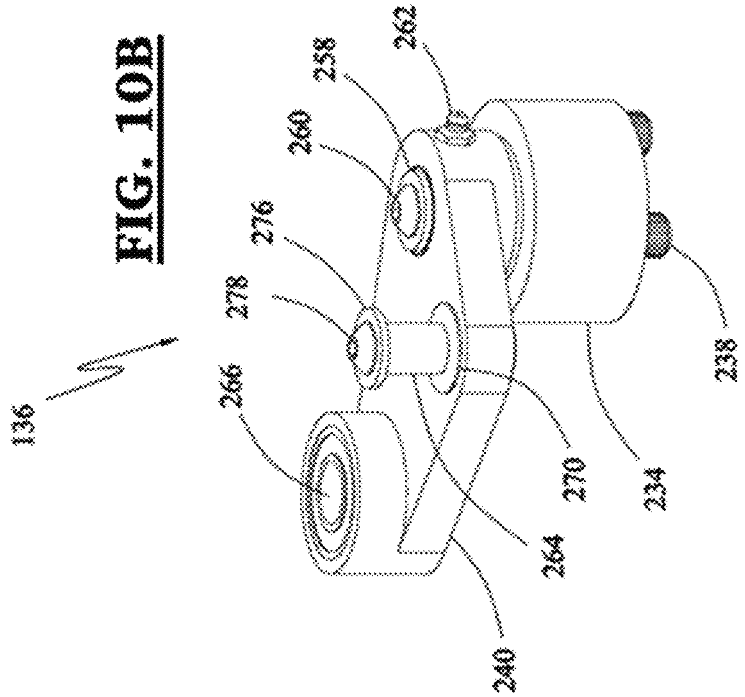
FIG. 10B is a perspective view of a cam pivot assembly according to one or more embodiments of the present invention.
Figure 10A:
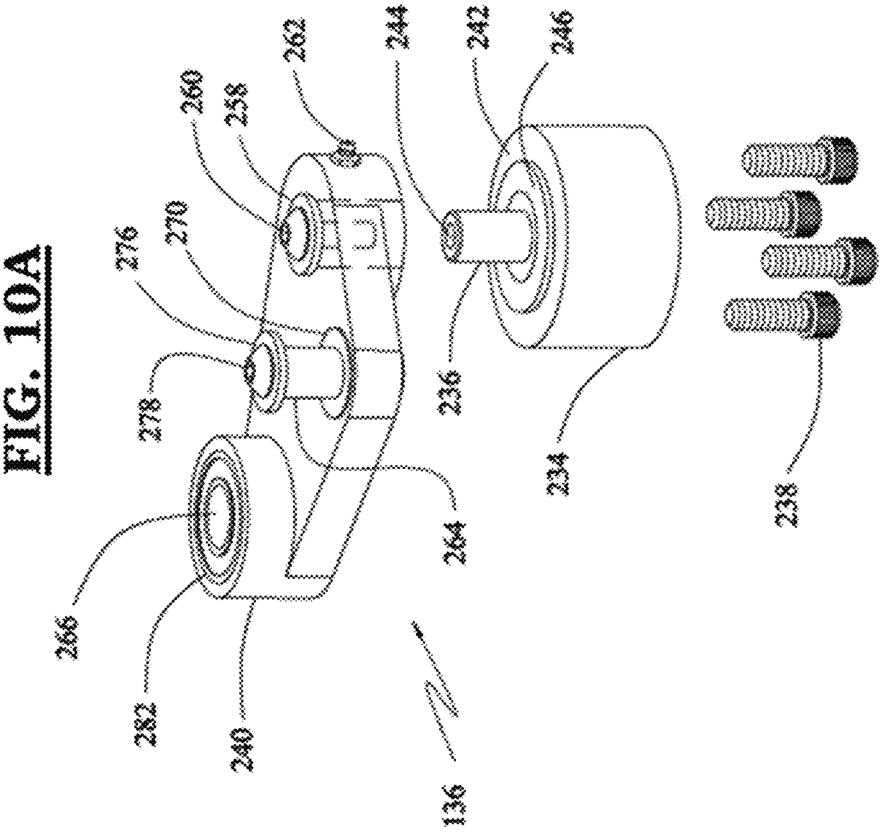
FIG. 10A is an exploded perspective view of a cam pivot assembly according to one or more embodiments of the present invention.

Turning now to FIGS. 10A-B, actuator arm assembly 134 is connected to the cam pivot assembly 136. As can be seen in FIGS. 10A-B, cam pivot assembly 136 includes a pivot standoff 234, having a standoff stud 236, and a cam pivot 240, and is bolted to actuator arm housing 72 by bolts 238 received by corresponding threaded openings (not shown) in the bottom of pivot standoff 234. Pivot standoff 234 may be secured to actuator arm mechanism housing 72 any suitable means known in the art, including, but not limited to, bolts, screws, rivets, welding or combinations thereof.

In one or embodiments of the present invention, cam pivot 240 may be attached to pivot standoff 234 as shown in FIG. 10A. In these embodiments, the top surface 242 of pivot standoff 234 includes standoff stud 236, which extends out from the center of top surface 242 of pivot standoff 234 and contains threaded opening 244, extending from the end of standoff stud 236 back into standoff stud 236. In some embodiments, top surface 242 of pivot standoff 234 may further include a raised ring 246, concentric with standoff stud 236 but separated from it, defining a recess into which one or more thrust washers and a thrust bearing may be placed. Cam pivot 240 is then seated on pivot standoff 234 so that standoff stud 236 passes through a first opening 254 in cam pivot 240, in to which a bearing may be placed, and is secured by means of washer 258 and bolt 260, which is received into threaded opening 244. Again, it should be understood that the invention is not to be limited to this bearing arrangement and any suitable bearing arrangement known in the art may be used. Likewise the mechanism for connecting cam pivot 240 to pivot standoff 234 is not particularly limited and may include other suitable mechanisms known in the art. In some of these embodiments, lubrication may be applied by means of grease fitting.

Figure 7:
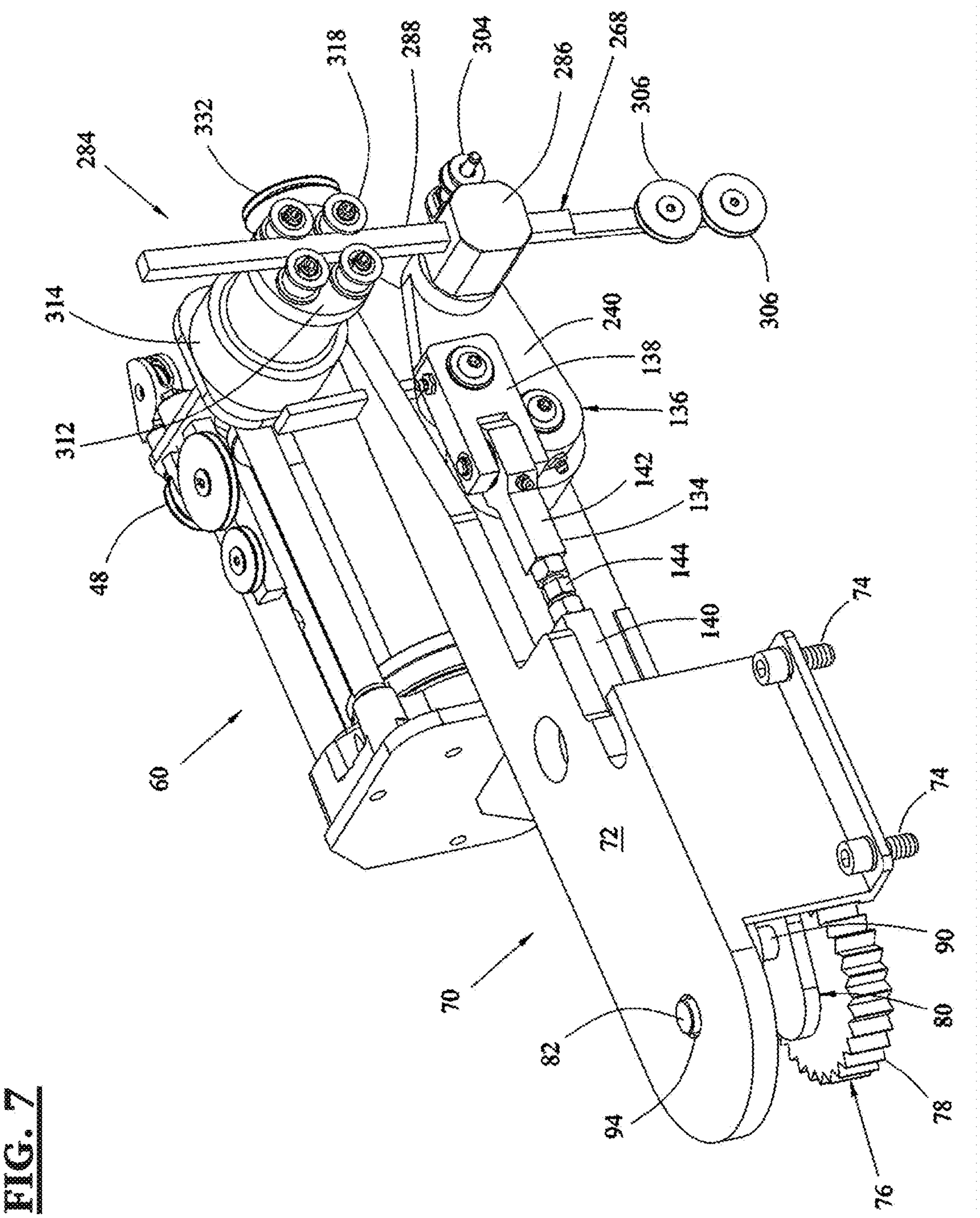
FIG. 7 is a perspective view of a rear carrier assembly and actuator arm mechanism according to one or more embodiments of the present invention.

Cam pivot 240 has three points of activation formed by and/or around first opening 254 (which receives standoff stud 236), second opening 266 (which receives transfer arm assembly 268), and cam pivot pin 264 (which is received by opening 220 of arm pivot 138) and may have the generally triangular shape shown in FIGS. 7 and 10A-B. First opening 254, second opening 266, and cam pivot pin 264 are oriented in a triangular arrangement, with cam pivot pin 264 offset from first opening 254 and second opening 266. In the embodiments shown in FIGS. 7 and 10A-B, first opening 254 and second opening 266 are in general alignment with each other and the longitudinal axis of actuator arm assembly 134 and the cam pivot pin 264 is located above and generally between first opening 254 and second opening 266. In some other embodiments, first opening 254 and second opening 266 are in general alignment with each other and with the longitudinal axis of actuator arm assembly 134, and cam pivot pin 264 is located below and generally between first opening 254 and second opening 266. The actual shape of cam pivot 240 is not particularly limited provided that first opening 254, second opening 266, and cam pivot pin 264 are oriented in a triangular arrangement, with cam pivot pin 264 offset from first opening 254 and second opening 266, and cam pivot 240 is free to rotate around standoff stud 236 without obstruction during braiding.

As set forth above, in shown in the embodiments of FIGS. 7 and 10A-B, cam pivot 240 can be described as a triangle shaped cam with three points of activation. As should be apparent to those of skill in the art, the first point of activation is the main pivot point, located at first opening 254, where cam pivot 240 pivots around standoff-stud 236 of pivot standoff 234. A second point of activation is formed by a second pivot point located at/around second opening 266, which receives and moves transfer arm assembly 268 and is generally in line with the first opening 254 as set forth above. In some embodiments, second opening 266 is fit with two bearings 282 installed on either side of second opening 266 and hold and help actuate transfer arm assembly 268. Again, it should be understood that the invention is not to be limited to this bearing arrangement and any suitable bearing arrangement known in the art may be used. The third point of activation is a third pivot point located at/around cam pivot pin 264, which is offset from the first two openings. As set forth above, the actuator arm assembly 134 is mounted to cam pivot pin 264 thru opening 220 and it is this interaction actuated the cam.

Cam pivot pin 264 is generally cylindrical in shape and is at least long enough to accommodate the thickness of the second end 218 of arm pivot 138. In the embodiment shown in FIG. 10A, thrust washers 270 and thrust bearing (not shown) are fit over cam pivot pin 264 and may be received by a recess surrounding cam pivot pin 264. In these embodiments, cam pivot pin 240 is then inserted through opening 220 of arm pivot 138 and secured by washer 276 and bolt 278. Bolt 278 is received into a threaded internal opening 280 in cam pivot pin 264. As will be apparent, arm pivot 138 is secured to cam pivot pin 236 in such a way as to allow rotational movement arm pivot 138 around cam pivot pin 236 as cam pivot assembly 136 is driven by actuator arm assembly 134.

Figure 11B:
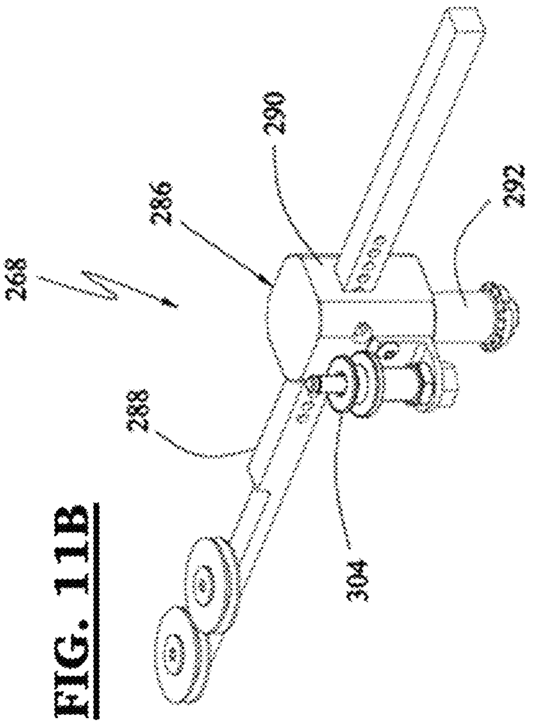
FIG. 11B is a perspective view of a transfer arm assembly according to one or more embodiments of the present invention.
Figure 11A:
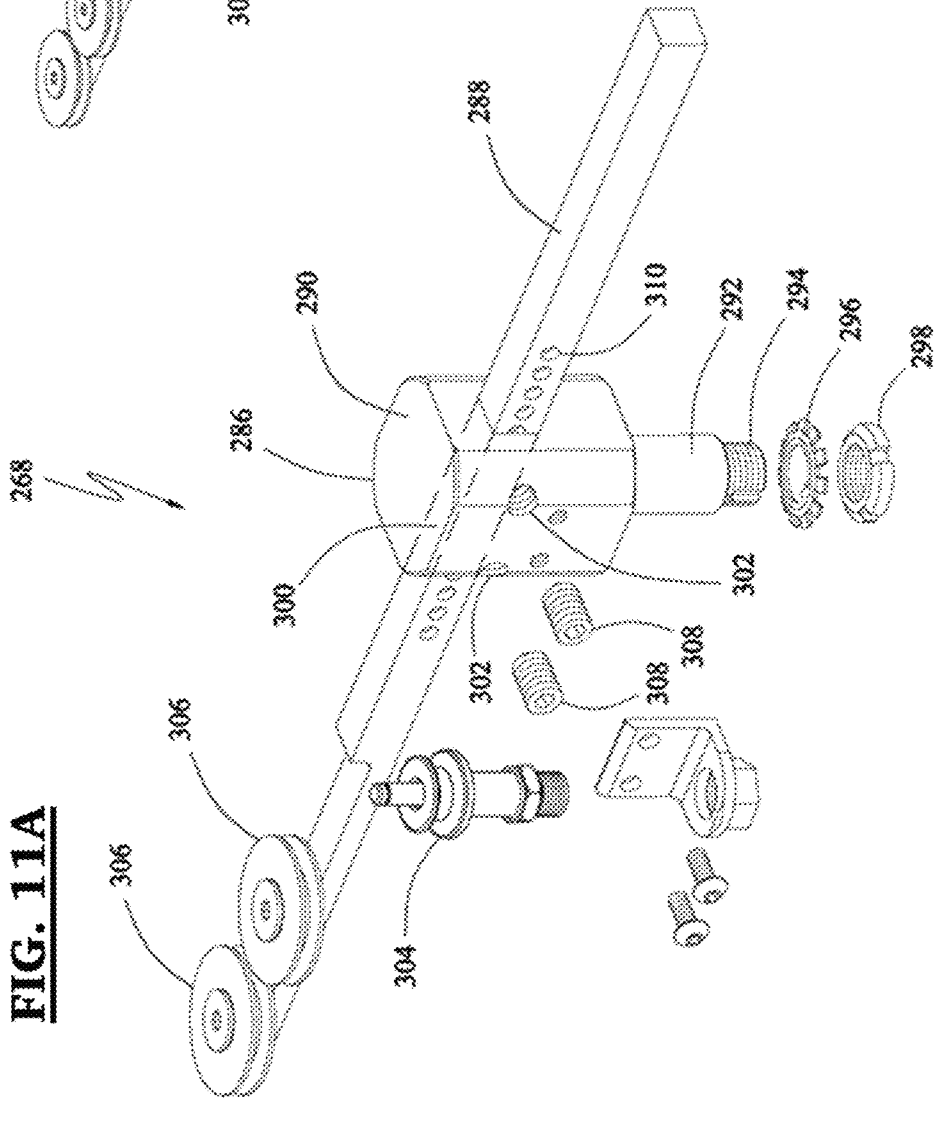
FIG. 11A is an exploded perspective view of a transfer arm assembly according to one or more embodiments of the present invention.

As can be seen in FIGS. 11A-B, actuator arm mechanism 70 further includes transfer arm assembly 268 and rear pivot assembly 284. As can be seen in the embodiment shown in FIG. 11B transfer arm assembly 268 comprises a rotary spindle 286 and a transfer arm 288. Turing to FIG. 11A, it can be seen that rotary spindle 286 has a body portion 290 and mounting post portion 292, the end of which is threaded. The mounting post portion 292 of rotary spindle 286 is inserted through the second opening 266 in cam pivot 240 and secured thereto by bearing lock-washer 296 and bearing lock-nut 298. The body portion 290 of rotary spindle 286 includes a passage 300 configured to permit transfer arm 288 to be inserted through rotary spindle 286 and one or more threaded openings 302 running from the outside of body portion 290 of rotary spindle 286 to passage 300. Fitted to the side of rotary spindle 286 are side rollers 304 and fitted to one end of transfer arm 288 are end rollers 306. The other end of transfer arm 288 interfaces with rear pivot assembly 284. Transfer arm 288 may be held in passage 300 by means of one or more set screws 308 inserted through threaded openings 302, and tightened against transfer arm 288. In some embodiments, transfer arm 288 may have a series of indentures 310 to permit the set screws to better secure transfer arm 288 in place.

Figure 12B:
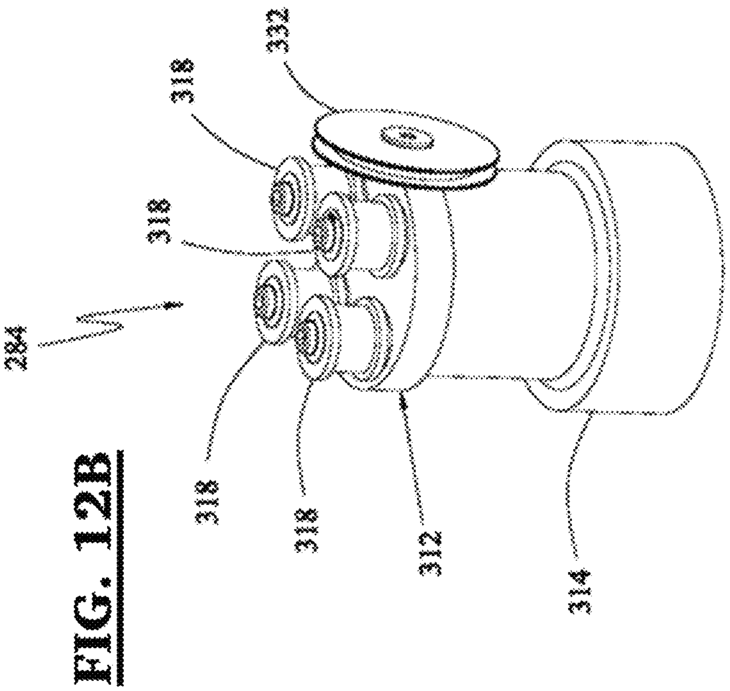
FIG. 12B is a perspective view of a rear pivot assembly according to one or more embodiments of the present invention.
Figure 12A:
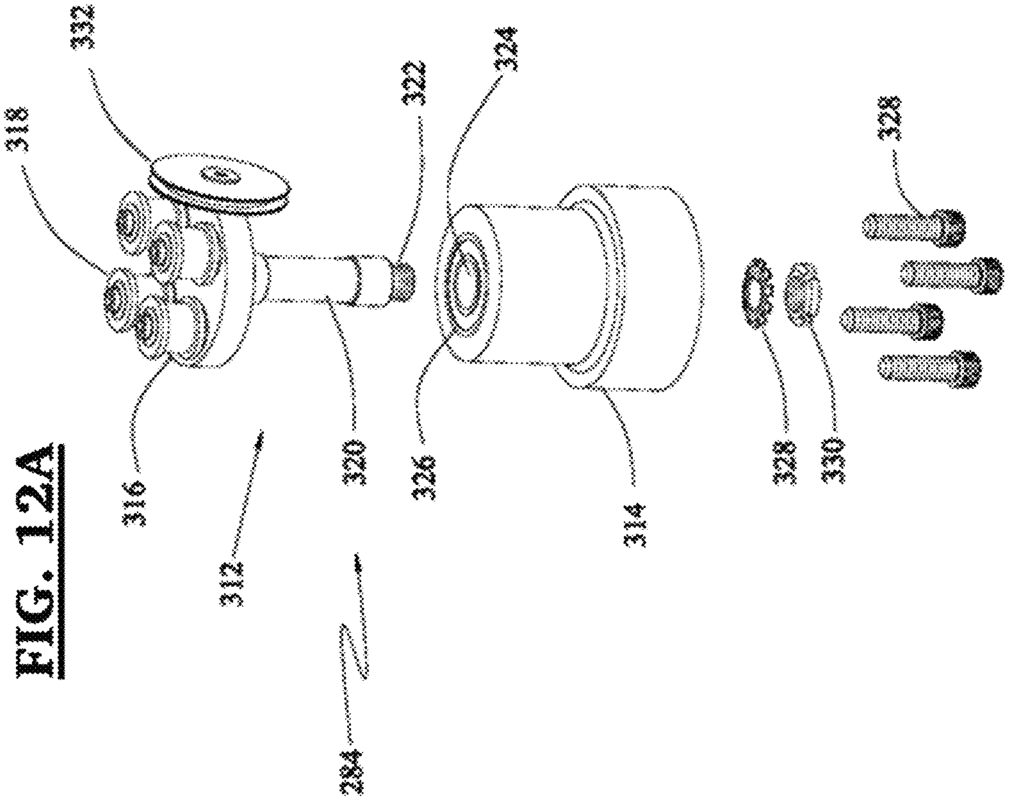
FIG. 12A is an exploded perspective view of a rear pivot assembly according to one or more embodiments of the present invention.

As can be seen In FIGS. 12A-B rear pivot assembly 284 includes lever arm pivot 312 and rotary standoff 314. In the embodiment shown in FIGS. 12A-B lever arm pivot 312 has a generally flat top portion 316 having a plurality of small rollers 318 sized to receive transfer arm 288 between them and a lower post portion 320 having a threaded end 322. In these embodiments, rotary standoff 314 has a bottom surface containing two or more threaded openings (not shown) and a central passageway 324 configured to receive lower post portion 320 of lever arm pivot 312, and bearings 326. Lower post portion 320 of lever arm pivot 312 may be secured to rotary standoff 314 by means of bearing lock-washer 328 and bearing lock-nut 330. Large roller 332 is secured to the edge of the general flat top portion 316 of lever arm pivot 312 as shown in FIG. 12A In some embodiments, rotary standoff 314 may be mounted to actuator arm housing 72 by bolts 334, received by two or more threaded openings (not shown) in the bottom surface of rotary standoff 314.

In general operation, the rotary braiding machine of the present invention may function as follows. As set forth above, motor 20 drives control plate 14 and external ring gear 18 at two different speeds in a first direction. A set of rear carriers 60 and actuator arm mechanisms 70 are attached to control plate 14 and will rotate with the control plate 14 in a first direction. A set of front carriers 62 are mounted on a set of trollies 83 running along front carrier track 46 such that their rack 87 meshes with the planetary gears 68, which surround and are driven by external ring gear 18. As will be appreciated by those of skill in the art, rotation of the external ring gear 18 in a first direction will cause the planetary gears 68 to drive the trollies 83 carrying front carriers 62 along front carrier track 46 in an opposite direction with respect to the direction of the external ring gear 18, control plate 14, rear carriers 60, and actuator arm mechanisms 70. To permit effective braiding, this gearing is configured so that the rotational speed of the rear carriers 60 and front carriers 62 will be the same.

The cable, hose, or other substrate upon which the strands are to be braided is fed from the rear of the braiding machine 10 through a central passageway 33 to a braiding point (not shown) at a predetermined speed. The cable, hose, or other substrate may be fed to the braiding point by any suitable means known in the art. In some embodiments, cable, hose, or other substrate may be fed to the braiding point by means of a conventional caterpillar haul off apparatus.

As the set of front carriers 62 rotates, the strands to be braided are paid out from the bobbins 81 of the front carriers 62 through tensioning mechanism 66 and to the braiding point. At the same time, strands are paid out from the bobbins 79 of the rear carriers 60 through the tensioning mechanism 48 and to the actuator arm mechanism 70, where it moves through large roller 332, side roller 304 and end rollers 306 before reaching the braiding point. As plate 14 rotates, the planetary gears 78 of drive assemblies 76 are pulled along the stationary internal ring gear 16 causing them to turn, thereby rotating crank 80.

As set forth above, crank 80 is connected to cam pivot pin 264 on cam 136. Accordingly, as crank 80 rotates it causes cam 136 to rotate around standoff stud 236 of pivot standoff 234, which is attached to housing 72. Transfer arm assembly 268 is attached to cam 136 through rotary spindle 286. Movement of cam 136, therefore, causes transfer arm 288 to pivot around rear pivot assembly 284 moving end rollers 306, and therefore the strand, along an arc over outer edge surface 40 of plate 14 between a first and a second position. To form the braid, transfer arm 288 moves an associated rear strand to the first position within one of the plurality of slots 44 in plate 14 to allow one or more of the front carriers and their associated strands to pass over the rear strand. In some embodiments, transfer arm 288 pulls the associated rear strand into contact with slot roller 45, but this need not be the case provided that the rear strand is sufficiently within slot 44 to ensure that the front carriers 62 and their associated strands can pass over the rear strand. The transfer arm, and with it the associated rear strand, then moves to a second position which is sufficiently forward as to allow one or more of the front carriers 62 and associated front strands to pass under the rear strand. This process is repeated for all of the actuator arm mechanisms 70 to form a braid in the conventional manner.

As will be appreciated by those of ordinary skill in the art, the braiding speed of a rotary braiding machine is largely dependent upon and limited by the timing between the various moving parts of the braiding machine. In particular, it has been found that the timing of the movement of transfer arm with respect to the movement of the front set of carriers is of particular importance. As set forth above, the wire being paid out from the outside carriers needs to pass between, under, and over the inside carriers to form the braid. As speeds and tensions increase their needs to be a way to time the strand to pass between, under and over the inside carriers at the exact time without interfering with the carriers. At higher speeds, even small timing problems can result in strands breaking or the machine being damaged. This is accomplished by retarding and advancing the timing of the strand as it goes from between the outside carrier and inside carrier on the way to the braid point. In light of this, the rotary braiding machines according to one or more embodiments of the present include a mechanism for fine tuning the dwell timing of the lever arm.

As used herein, the term "dwell" or "dwell timing" refer to the length of time spent by the transfer arm 268 at the top and the bottom its travel path of the to allow the opposite traveling inside carrier to pass. Like most rotary braiders, the rotary braiding machines of various embodiments of the present invention has a macro timing adjustment mechanism that adjusts the rotational position of all the rear carriers at the same time using a turnbuckle (not shown) to move all of the rear carriers with respect to the slots 44 to advance or retard the timing. As set forth above, the rotary braiding machines of various embodiments of the present invention further comprises micro timing dwell adjustment mechanisms on each lever arm module 70. This arrangement allows individual adjustment of the timing of each lever arm module 70 to help eliminate or at least mitigate the effect of any manufacturing irregularities or other differences in the individual carriers. By providing this level of precise control over the dwell timing, the rotary braiding machines of the present invention are able to run faster with fewer broken strands.

As set forth above, the dwell timing of each lever arm module 70 may be fine-tuned by rotating central nut 132 of actuating arm adjuster 144 to increase or decrease the length of actuator arm assembly 134. In the embodiments shown in FIGS. 1-12, it has been found that decreasing the length of the actuator arm assembly 134, increases the dwell time through a dynamic interaction of actuator arm assembly 134 with cam pivot 136, as described above. Conversely, it has been found that increasing the length of the actuator arm assembly 134, decreases the dwell time through a dynamic interaction of actuator arm assembly 134 with cam pivot 136, as described above.

Further, the simplicity of the design of the dwell timing adjustment mechanism described above permits easy adjustment of the dwell timing for each of the lever arms without significantly adding to the complexity of the actuator arm mechanism. When compared to prior art systems, it is believed that the overall simplicity of the actuator arm mechanism of the various embodiments of the present invention will result in reduced maintenance costs and system shut down time. Reduction number of moving parts and use of a more linear linkage for the actuating arm mechanism, will likewise reduce maladjustment of the mechanism caused by the wear on the various moving parts and permit consistently higher braiding speeds.

In light of the foregoing, it should be appreciated that the present invention significantly advances the art by providing a rotary braiding machine that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. An apparatus for controlling the dwell timing of a transfer arm in a rotary braiding machine comprising:

a crank;

a cam for moving a transfer arm of a rotary braiding machine;

an actuator arm mechanism operatively connected to said crank and said cam comprising:

a first actuator arm having a crank end operatively connected to said crank and an adjuster end having a threaded opening with threads oriented to rotate in a first direction;

a second actuator arm having a cam end operatively connected to said cam and an adjuster end having a threaded opening with threads oriented to rotate in a second direction that is opposite to said first direction;

an actuating arm adjuster connected to the adjuster end of said first actuator arm and the adjuster end of said second actuator arm for controlling the length of said actuator arm mechanism.

2. The apparatus of claim 1 wherein said actuating arm adjuster comprises:

a first threaded end sized to fit within the threaded opening in the adjuster end of said first actuator arm and the threads of the first threaded end of said actuating arm adjuster being configured to mesh with the threads of the threaded opening in the adjuster end of said first actuator arm;

a second threaded end sized to fit within the threaded opening of the adjuster end of said second actuator arm and the threads of the second threaded end of said actuating arm adjuster being configured to mesh with the threads of the threaded opening in the adjuster end of said second actuator arm; and a central portion configured to mate with a tool for turning said actuating arm adjuster to lengthen or shorten said actuator arm mechanism.

3. The apparatus of claim 2 wherein said actuating arm adjuster further comprises a first retaining nut having threads configured to mesh with the threads of the first threaded end of said actuating arm adjuster and a second retaining nut having threads configured to mesh with the threads of the second threaded end of said actuating arm adjuster.

4. The apparatus of claim 1 wherein said actuator arm mechanism has a dwell timing that may be adjusted by turning said actuating arm adjuster.

5. The apparatus of claim 2 wherein said actuator arm mechanism has a dwell timing that may be adjusted by turning said actuating arm adjuster to lengthen or shorten said actuator arm mechanism.

6. The apparatus of claim 1 wherein said first actuator arm is connected to said crank via an arm pivot, wherein said arm pivot comprises a crank end having an opening for receiving an offset post on said crank and a forked end for receiving the crank end of said first actuator arm.

7. The apparatus of claim 6 wherein the offset post on said crank is free to rotate with respect to said arm pivot in a first plane and the crank end of said first actuator arm is free to rotate with respect to said arm pivot in a second plane, offset from said first plane by about 90 degrees.

8. The apparatus of claim 1 wherein said second actuator arm is connected to said cam via an arm pivot, wherein said arm pivot comprises a cam end having an opening for receiving a post on said cam and a forked end for receiving the cam end of said second actuator arm.

9. The apparatus of claim 8 wherein said cam is free to rotate with respect to said arm pivot in a first plane and the cam end of said second actuator arm is free to rotate with respect to said arm pivot in a second plane, wherein said first plane is offset from said second plane by about 90 degrees.

10. The apparatus of claim 1 wherein the crank end of said first actuator arm further comprises a substantially cylindrical opening having an axis and the cam end of said second actuator arm further comprises a substantially cylindrical opening having an axis perpendicular to the axis of the substantially cylindrical opening in the crank end of said first actuator arm.

11. A method of adjusting the dwell timing using the apparatus of claim 1 comprising using actuating arm adjuster to change the length of the actuating arm.

12. A method of adjusting the dwell timing using the apparatus of claim 2 comprising:

a) securing a tool to the central portion of the actuating arm adjuster;

b) using the tool to rotate the central portion of the actuating arm adjuster to lengthen or shorten said actuator arm mechanism and adjust the dwell timing.

* * * * *